US012693987B2

(12) United States Patent
Jung et al.

(10) Patent No.: US 12,693,987 B2
(45) Date of Patent: Jul. 28, 2026

(54) MEMORY EXPANDER, COMPUTING SYSTEMS, AND OPERATING METHOD OF THE HOST DEVICE

(71) Applicants: Korea Advanced Institute of Science and Technology, Daejeon (KR); Panmnesia Inc., Daejeon (KR)

(72) Inventors: Myoungsoo Jung, Daejeon (KR); Miryeong Kwon, Daejeon (KR); Junhyeok Jang, Daejeon (KR); Seungjun Lee, Daejeon (KR); Hanjin Choi, Daejeon (KR); Hanyeoreum Bae, Daejeon (KR)

(73) Assignees: Korea Advanced Institute of Science and Technology, Daejeon (KR); Panmnesia Inc., Daejeon (KR)

( * ) Notice: Subject to any disclaimer, the term of this patent is extended or adjusted under 35 U.S.C. 154(b) by 10 days.

(21) Appl. No.: 18/797,821

(22) Filed: Aug. 8, 2024

(65) Prior Publication Data

US 2025/0061077 A1    Feb. 20, 2025

(30) Foreign Application Priority Data

Aug. 14, 2023    (KR) ........................ 10-2023-0106507

(51) Int. Cl.
G06F 17/16      (2006.01)
G06F 9/48       (2006.01)
(Continued)

(52) U.S. Cl.
CPC ........ G06F 13/4022 (2013.01); G06F 9/4881 (2013.01); G06F 13/1668 (2013.01)

(58) Field of Classification Search
None
See application file for complete search history.

(56) References Cited

U.S. PATENT DOCUMENTS

| | | | | |
|---|---|---|---|---|
| 11,086,813 B1 * | 8/2021 | Schuette | ............. | G06F 13/4022 |
| 2017/0212858 A1 * | 7/2017 | Chu | .................... | G06F 13/4022 |

(Continued)

FOREIGN PATENT DOCUMENTS

| | | |
|---|---|---|
| KR | 20190092337 A | 8/2019 |
| KR | 20200125468 A | 11/2020 |

(Continued)

OTHER PUBLICATIONS

Annoy, "Approximate Nearest Neighbors in C+ + /Python optimized for memory usage and loading/saving to disk," Spotify, 7 pages (2023) <URL: https://github.com/spotify/annoy >.

(Continued)

*Primary Examiner* — Hyun Nam
(74) *Attorney, Agent, or Firm* — KDW Firm PLLC

(57) ABSTRACT

A memory expander is disclosed. The memory expander includes a memory, a memory controller configured to control the memory, a compute express link (CXL) engine configured to acquire a CXL flit from a host device connected to the memory expander and configured to acquire a calculation request for pieces of data stored in the memory by performing conversion on the CXL flit, and a domain-specific accelerator configured to perform a calculation in response to the calculation request.

20 Claims, 14 Drawing Sheets

(51) Int. Cl.
  *G06F 13/16*     (2006.01)
  *G06F 13/40*     (2006.01)

(56) References Cited

U.S. PATENT DOCUMENTS

| | | | |
|---|---|---|---|
| 2018/0024957 A1* | 1/2018 | Nachimuthu | H03M 7/3084 |
| 2021/0326290 A1* | 10/2021 | Wietfeldt | H04L 43/0817 |
| 2021/0382841 A1* | 12/2021 | Robertson | G06F 9/4812 |
| 2022/0058468 A1* | 2/2022 | Gadfort | G06F 15/7867 |
| 2022/0197848 A1* | 6/2022 | Chou | G06F 13/409 |
| 2023/0089863 A1* | 3/2023 | Kishore | G06F 21/54 |
| | | | 726/26 |
| 2023/0195657 A1 | 6/2023 | Agarwal et al. | |
| 2023/0236742 A1* | 7/2023 | Sehgal | G06F 3/0679 |
| | | | 711/154 |
| 2024/0184477 A1* | 6/2024 | Agarwal | G06F 3/0655 |
| 2025/0021504 A1* | 1/2025 | Doddi | G06F 13/42 |
| 2025/0061077 A1* | 2/2025 | Jung | G06F 9/4881 |
| 2025/0298530 A1* | 9/2025 | Zhao | G06F 9/5088 |
| 2025/0307183 A1* | 10/2025 | Wang | G06F 13/1684 |

FOREIGN PATENT DOCUMENTS

| | | |
|---|---|---|
| KR | 20230095775 A | 6/2023 |
| WO | 2023129305 A1 | 7/2023 |

OTHER PUBLICATIONS

Aumueller et al., "Benchmarking Results," ANN-Benchmarks.com [website] 32 pages (2024) <URL: http://ann-benchmarks.com/ >.

Aumueller et al., "Plots for glove-100-angular (k=10)," ANN-Benchmarks.com [website] 8 pages (2024) <URL: http://ann-benchmarks.com/glove-100-angular_10_angular.html >.

Big-Ann, "NeurIPS'23 Competition Track: Big-ANN," [website] 7 pages (Mar. 2024) <URL: https://big-ann-benchmarks.com/neurips23.html >.

Chen et al., "Approximate Nearest Neighbor Search under Neural Similarity Metric for Large-Scale Recommendation," In Proceedings of the 31st ACM International Conference on Information & Knowledge Management (CIKM 2022): 3013-3022 (2022).

Chen et al., "SPANN: Highly-efficient Billion-scale Approximate Nearest Neighbor Search," In 35th Conference on Neural Information Processing Systems, (NeurIPS 2021), 14 pages (2021).

Covington et al., "Deep Neural Networks for YouTube Recommendations," In Proceedings of the 10th ACM Conference on Recommender Systems, (RecSys 2016) 8 pages (Sep. 2016).

Fu et al., "Fast Approximate Nearest Neighbor Search With The Navigating Spreading-out Graph," Proceedings of the International Conference on Very Large Databases (VLDB), vol. 12: 21 pages (2018).

Graphann, "Winning the NeurIPS BillionScale Approximate Nearest Neighbor Search Challenge: Unleashing Intel® Xeon® Processors with Intel® Optane™ Technology to Drastically Improve Search Performance," Intel.com, 7 pages (Jul. 2024) <URL: intel.com/content/www/us/en/developer/articles/technical/winning-neurips-billion-scale-ann-search-challeng.html >.

Grbovic et al., "Real-time Personalization using Embeddings for Search Ranking at Airbnb," In Proceedings of the 24th ACM SIGKDD International Conference on Knowledge Discovery & Data Mining, (KDD 2018) 10 pages (Aug. 2018).

Guo et al., "Accelerating Large-Scale Inference with Anisotropic Vector Quantization," Proceedings of the 37th International Conference on Machine Learning (PMLR 119), 10 pages (2020).

Huang et al., "Embedding-based Retrieval in Facebook Search," Applied Data Science Track Paper, KDD 2020 Virtual Event, 9 pages (Aug. 2020).

Indyk et al., "Approximate Nearest Neighbors: Towards Removing the Curse of Dimensionality," In Proceedings of the thirtieth annual ACM symposium on Theory of Computing (STOC'98): 604-613 (May 1998).

Jegou et al., "Product Quantization for Nearest Neighbor Search," IEEE Transactions on Pattern Analysts and Machine Intelligence, vol. 33, No. 1: 117-128 (2011).

Johnson et al., "Billion-scale similarity search with GPUs," IEEE Transactions on Big Data, vol. 7, Issue 3: 535-547 (Feb. 2017).

Koh, "Manas HNSW Streaming Filters," Pinterest Engineering Blog, [Blog], 14 pages (May 2022) <URL: https://medium.com/pinterest-engineering/manas-hnsw-streaming-filters-351adf9ac1c4 >.

Lee et al., "ANNA: Specialized Architecture for Approximate Nearest Neighbor Search," In 2022 IEEE International Symposium on High-Performance Computer Architecture (HPCA), 169-183 (2022).

Li et al., "Approximate Nearest Neighbor Search on High Dimensional Data—Experiments, Analyses, and Improvement (v1.0)," IEEE Transactions on Knowledge and Data Engineering, 26 pages (Oct. 2016).

Malkov et al., "Approximate nearest neighbor algorithm based on navigable small world graphs," Information Systems, vol. 45: 61-68 (2014).

Medvedev et al., "Powered by AI: Instagram's Explore recommender system," ML Applications, [blog] 13 pages (Nov. 2019) <URL: https://ai.facebook.com/blog/powered-by-ai-instagrams-explore-recommender-system/ >.

Milvus, "The High-Performance Vector Database Built for Scale," milvus.io [website] 7 pages (Jun. 2024) <URL: https://milvus.io/ >.

Pinecone Systems Inc., "Hierarchical Navigable Small Worlds (HNSW)," [website] 23 pages (May 2024) <URL: https://www.pinecone.io/learn/series/faiss/hnsw/ >.

Ren et al., "HM-ANN: Efficient Billion-Point Nearest Neighbor Search on Heterogeneous Memory," In 34th Conference on Neural Information Processing Systems (NeurIPS 2020), Article No. 895: 10672-10684 (Dec. 2020).

Sato et al., "Find anything blazingly fast with Google's vector search technology," Google Cloud, 25 pages (2021) <URL: https://cloud.google.com/blog/topics/developers-practitioners/find-anything-blazingly-fast-googles-vector-search-technology >.

Simhadri et al., "Results of the NeurIPS'21 Challenge on Billion-Scale Approximate Nearest Neighbor Search," In Proceedings of Machine Learning Research, (NeurIPS 2021 Competition and Demonstration Track), vol. 176: 177-189 (2022).

Singh et al., "FreshDiskANN: A Fast and Accurate Graph-Based ANN Index for Streaming Similarity Search," arXiv:2015.09613v1, 19 pages (May 2021).

Subramanya et al., "DishANN: Fast Accurate Billion-point Nearest Neighbor Search on a Single Node," In 33rd Conference on Neural Information Processing Systems (NeurIPS 2019), Article No. 1233: 13766-13776 (Dec. 2019).

Tepper et al., "Winning the NeurIPS BillionScale Approximate Nearest Neighbor Search Challenge: Unleashing Intel® Xeon® Processors with Intel® Optane™ Technology to Drastically Improve Search Performance," Intel.com, 7 pages (Jul. 2024) <URL: intel.com/content/www/us/en/developer/articles/technical/winning-neurips-billion-scale-ann-search-challeng.html >.

Tibshirani, "Introducing approximate nearest neighbor search in Elasticsearch 8.0," Elastic, 9 pages (2022) <URL: https://www.elastic.co/kr/blog/introducing-approximate-nearest-neighbor-search-in-elasticsearch-8-0 >.

Waldburger, "As search needs evolve, Microsoft makes AI tools for better search available to researcher and developers," Microsoft, [Blog] 6 pages (2019) <URL: https://blogs.microsoft.com/ai/bing-vector-search/ >.

Wang et al., "Milvus: A Purpose-Built Vector Data Management System," In Annual ACM Special Interest Group on Management of Data (SIGMOD '21), 14 pages (Jun. 2021).

Zhang et al., "Visual Search at Alibaba," In KDD 2018: The 24th Acm Sigkdd International Conference on Knowledge Discovery & Data Mining, arXiv:2102.04674v1, 9 pages (Feb. 2021).

* cited by examiner

① Hop calculation 1201 ⟹     ② Sort 1202     ⟹     ③ Dispose 1203

MEMORY EXPANDER, COMPUTING SYSTEMS, AND OPERATING METHOD OF THE HOST DEVICE

CROSS-REFERENCE TO RELATED APPLICATIONS

This application claims the benefit of Korean Patent Application No. 10-2023-0106507, filed on Aug. 14, 2023, in the Korean Intellectual Property Office, the entire disclosure of which is incorporated herein by reference for all purposes.

BACKGROUND

1. Field of the Invention

One or more embodiments relate to a memory expander, a computing system, and an operating method of a host device.

2. Description of the Related Art

Cache coherent interconnect is technology used to maintain cache coherency in a computing system. Cache coherency refers to that a plurality of caches maintaining memory coherency in the computing system. Cache coherent interconnect may ensure cache coherency by connecting a central processing unit (CPU) of a host device to a memory of a peripheral device (e.g., a device connected to a host device). Through a cache coherent network, a user may secure a large amount of memory and quickly access data stored in such a memory.

Recent cache coherent interconnect is represented by a compute express link (CXL). The CXL is technology configured by adding several functions to ensure cache coherency atop peripheral component interconnect express (PCIe), which is existing technology connecting a host device to a peripheral device. The CXL includes three sub-protocols (e.g., CXL.io, CXL.cache, and CXL.mem).

A CXL device that supports a CXL protocol is classified into type 1, type 2, and type 3 devices depending on the type of sub-protocol that is supported. A type-1 device supports only CXL.cache, and an accelerator is a representative example of the type-1 device. A type-2 device supports CXL.cache and CXL.mem, and a graphics processing unit (GPU) is a representative example of the type-2 device. A type-3 device supports CXL.mem, and a memory expander is a representative example of the type-3 device. The memory expander includes a controller that processes an input and/or an output and a memory (e.g., a memory module) and may be connected to a host device and provide a additional memory to the host device.

Cache coherent interconnect may provide a large amount of memory to an application executed by a host by connecting a memory expander to a host device. A representative application that requires a large amount of memory includes machine learning or a machine learning-based application. The machine learning-based application includes applications such as an approximate nearest neighbor search, a recommendation system, and a graph neural network. Each of the machine learning-based applications is characterized in that large-scale tensors must be stored and processed. The large-scale tensors (e.g., embedding tables) have a data structure that collects vector-type information about each object managed by an application in consecutive memories. The processing of the embedding tables is performed not on the entire table, but on the number of vectors for a certain object included in the table, and the process of searching for and reading a corresponding vector is referred to as an embedding lookup.

The sizes of tensors are rapidly increasing. For example, Microsoft's search engine requires more than 40 terabytes (TB) of a memory, with an embedding table including 10 billion vectors. In such an application, CXL-based memory expansion may help seamless execution by allowing all tensors to be accommodated in a memory.

SUMMARY

According to an aspect, there is provided a memory expander including a memory, a memory controller configured to control the memory, a compute express link (CXL) engine configured to acquire a CXL flit from a host device connected to the memory expander and configured to acquire a calculation request for pieces of data stored in the memory by performing conversion on the CXL flit, and a domain-specific accelerator configured to perform a calculation in response to the calculation request.

The memory expander may be a type-3 device defined in a CXL protocol.

The memory expander may further include an interface register configured to acquire a doorbell signal from the host device, in which the doorbell signal may be a signal indicating that a command and data associated with the calculation request are written to a host memory of the host device.

The domain-specific accelerator may include a request queue configured to store the calculation request of the host device, a scheduler configured to allocate the calculation request to one or more tensor calculation accelerator, one or more tensor calculation accelerator configured to perform a calculation between tensors in response to the allocated calculation request, a tensor reading module configured to read the tensors from the memory, and a multiplexer configured to support one or more tensor calculation accelerator to share the tensor reading module.

One or more tensor calculation accelerator may include at least one element-wise calculation module configured to perform a first operation on corresponding elements among elements forming each of the tensors, and a tensor reduction module configured to perform a second operation on a result of the first operation.

Each of the tensors may be divided and stored in a plurality of memory expanders including the memory expander, and one or more tensor calculation accelerator may be configured to perform a calculation on at least a portion of the tensors.

Each of the tensors may correspond to an embedding vector, and the at least one tensor calculation accelerator may be configured to calculate a similarity between an input vector acquired from the host device and stored in the memory and a vector pre-stored in the memory.

The similarity may correspond to a Euclidean distance between the input vector and the vector or an angular distance between the input vector and the vector.

According to another aspect, there is provided a computing system including a host device configured to store a command and data associated with a calculation request in a host memory and configured to transmit a doorbell signal associated with the calculation request to a memory expander, and the memory expander configured to perform a calculation between tensors corresponding to the calculation request in response to receiving the doorbell signal and configured to transmit a result of the calculation between the tensors to the host memory, in which the tensors are stored in the memory expander.

The doorbell signal may be received by an interface register of the memory expander.

The memory expander may be configured to, acquire a CXL flit associated with the calculation request by accessing the host memory, acquire the command and the data by performing conversion on the CXL flit, and perform a calculation between the tensors based on the command and the data.

The accessing of the memory expander to the host memory may be direct memory access (DMA).

The calculation between the tensors may be performed by a domain-specific accelerator included in the memory expander.

The memory expander may be a type-3 device defined in a CXL protocol.

According to still another aspect, an operating method of a host device configured to perform an approximate nearest neighbor search on tensors based on a search node includes: acquiring graph data, in which each of nodes of the graph data corresponds to the tensors stored in a memory expander, acquiring information of a neighbor node neighboring the search node by searching for the graph data, acquiring a result of a calculation between the tensors stored in the memory expander and an input tensor input to the host device, based on the information of the neighbor node, and updating a candidate array based on the result of the calculation, in which the candidate array includes, among the tensors stored in the memory expander, information about a tensor that is similar to the input tensor.

The calculation may be performed by the memory expander, which is a type-3 device defined in a CXL protocol.

The candidate array may include the nodes included in the graph data, in which the nodes may be mapping of a correspondence relationship between the nodes and the tensors stored in the memory expander, whether the nodes visit, and a calculation result between tensors corresponding to the nodes and the input tensor.

The updating of the candidate array may include inserting information into the candidate array, sorting nodes of the candidate array into which the information is inserted, and selecting a subsequent search node from the sorted nodes of the candidate array.

The inserting of the information into the candidate array may include displaying whether the search node visits, adding the neighbor node to the candidate array, and mapping the result of the calculation to the neighbor node.

The selecting of the subsequent search node may further include selecting, from among unvisited nodes in the sorted nodes of the candidate array, a node having a highest similarity with the input tensor as the subsequent search node.

The operating method may be terminated when there is no unvisited node among nodes forming the candidate array.

At least a portion of the graph data may be stored in a host memory of the host device, in which the at least the portion of the graph data may be determined based on a preset hop count by neighbor nodes of an initial search node.

The operating method may further include predicting a subsequent search node immediately after searching for the graph data, in which the updating of the candidate array may be performed in parallel with acquiring subsequent graph data.

The selecting of the subsequent search node may be performed immediately after acquiring of the result of the calculation, and the updating of the candidate array may be performed together with searching for subsequent graph data.

Additional aspects of embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Figure 1:
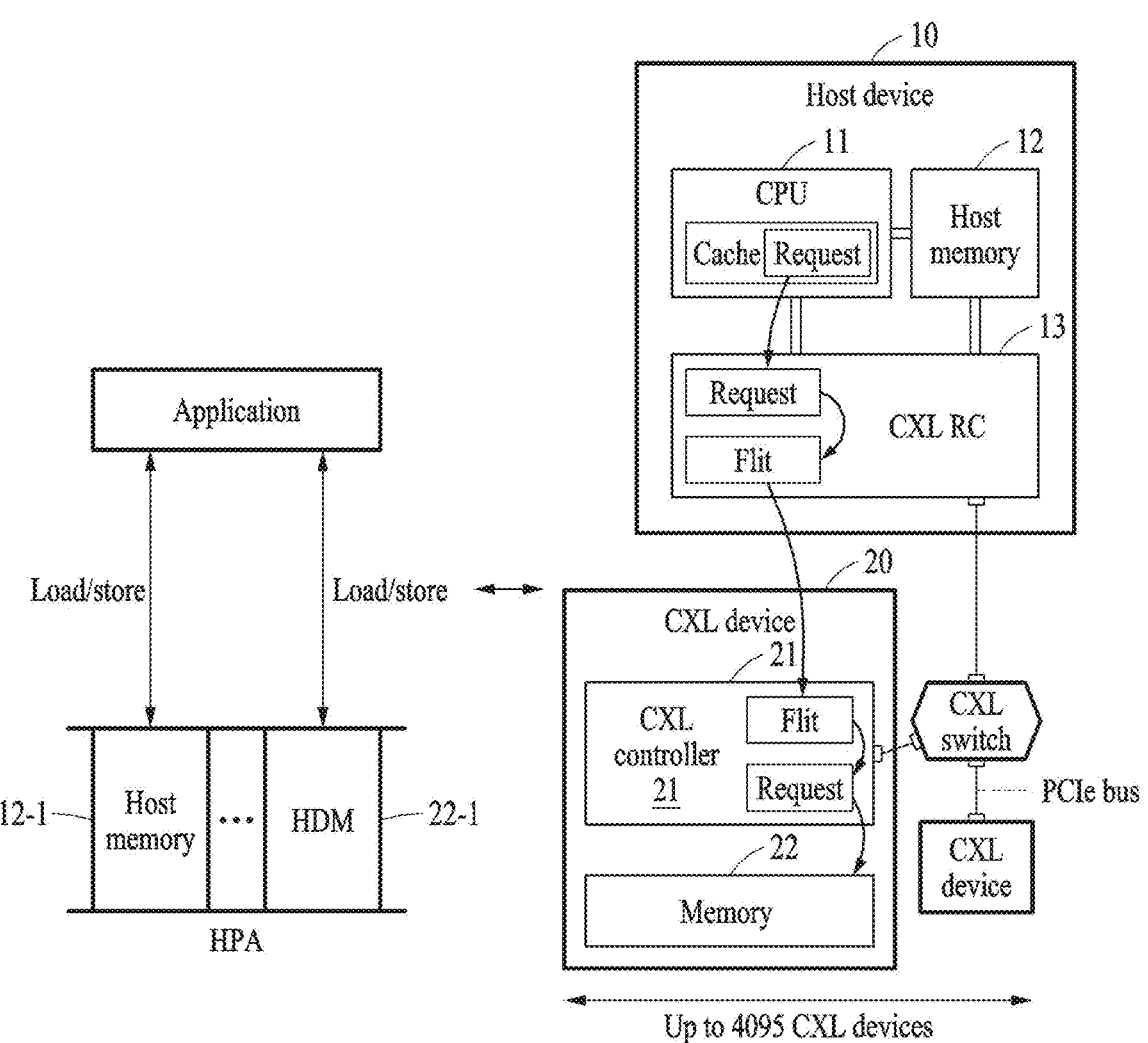
FIG. 1 is a diagram illustrating a compute express link (CXL) protocol.

The following detailed structural or functional description is provided as an example only and various alterations and modifications may be made to the embodiments.

Accordingly, the embodiments are not construed as limited to the disclosure and should be understood to include all changes, equivalents, and replacements within the idea and the technical scope of the disclosure.

Although terms, such as first, second, and the like are used to describe various components, the components are not limited to the terms. These terms should be used only to distinguish one component from another component. For example, a first component may be referred to as a second component, or similarly, the second component may be referred to as the first component.

It should be noted that if it is described that one component is "connected", "coupled", or "joined" to another component, a third component may be "connected", "coupled", and "joined" between the first and second components, although the first component may be directly connected, coupled, or joined to the second component.

The singular forms "a", "an", and "the" are intended to include the plural forms as well, unless the context clearly indicates otherwise. As used herein, "A or B," "at least one of A and B," "at least one of A or B," "A, B or C," "at least one of A, B and C," and "at least one of A, B, or C," each of which may include any one of the items listed together in the corresponding one of the phrases, or all possible combinations thereof. It will be further understood that the terms "comprises/comprising" and/or "includes/including" when used herein, specify the presence of stated features, integers, steps, operations, elements, and/or components, but do not preclude the presence or addition of one or more other features, integers, steps, operations, elements, components and/or groups thereof.

Unless otherwise defined, all terms, including technical and scientific terms, used herein have the same meaning as commonly understood by one of ordinary skill in the art to which this disclosure pertains. Terms, such as those defined in commonly used dictionaries, should be construed to have meanings matching with contextual meanings in the relevant art, and are not to be construed to have an ideal or excessively formal meaning unless otherwise defined herein.

As used in connection with the present disclosure, the term "module" may include a unit implemented in hardware, software, or firmware, and may interchangeably be used with other terms, for example, "logic," "logic block," "part," or "circuitry". A module may be a single integral component, or a minimum unit or pail thereof, adapted to perform one or more functions. For example, according to an embodiment, the module may be implemented in a form of an application-specific integrated circuit (ASIC).

The term "unit" used herein may refer to a software or hardware component, such as a field-programmable gate array (FPGA) or an ASIC, and the "unit" performs predefined functions. However, the term "unit" is not limited to software or hardware. A "unit" may be configured to be in an addressable storage medium or configured to operate one or more processors. Accordingly, the "unit" may include, for example, components, such as software components, object-oriented software components, class components, and task components, processes, functions, attributes, procedures, sub-routines, segments of program code, drivers, firmware, microcode, circuitry, data, databases, data structures, tables, arrays, and variables. The functionalities provided in the components and "units" may be combined into fewer components and "units" or may be further separated into additional components and "units." Furthermore, the components and "units" may be implemented to operate on one or more central processing units (CPUs) within a device or a security multimedia card. In addition, "unit" may include one or more processors.

Hereinafter, embodiments will be described in detail with reference to the accompanying drawings. When describing the embodiments with reference to the accompanying drawings, like reference numerals refer to like elements and a repeated description related thereto will be omitted.

FIG. 1 is a diagram illustrating a compute express link (CXL) protocol.

FIG. 1 shows an example of a computing system that supports the CXL protocol. The computing system may include a host device 10 and a CXL device (e.g., 20). The host device and the CXL device (e.g., 20) may be connected by a CXL switch.

The host device 10 may include a central processing unit (CPU) 11, a host memory 12 (e.g., dynamic random-access memory (DRAM) (e.g., local DRAM)), and a CXL root complex (RC) 13. The host memory 12 may be mapped to a host physical address (HPA) (e.g., 12-1).

The CXL device 20 may be a type-3 device defined in the CXL protocol. The CXL device 20 may be a memory expander. The CXL device 20 may include a CXL controller 21 and a memory 22 (e.g. DRAM). The memory 22 may be mapped to an HPA (e.g., a host-managed device memory (HDM) 22-1).

The CPU 11 that supports the CXL protocol may access the host memory 12-1 and the HDM 22-1 through a load command and a store command. A memory request directed to the HDM 22-1 may be cached in the same manner as a memory request directed to the host memory 12-1. The memory request directed to the HDM 22-1 may be converted into a packet (e.g., a flit) that follows the CXL protocol.

When the CPU 11 evicts a cache line, the memory request directed to the HDM 22-1 may be transmitted to the CXL RC 13 of a host. The CXL RC 13 may convert the memory request into a CXL flit that follows a CXL.mem protocol. The CXL flit may be transmitted to the CXL device 20 (e.g., a type-3 device) through the CXL switch. The CXL controller 21 of the CXL device 20 may convert the CXL flit into the memory request. The CXL controller 21 may transmit the memory request to the memory 22 (e.g., a memory corresponding to the HDM 22-1), allowing the memory 22 to process the memory request (e.g., a read request and/or a write request). Even when the CXL device 20 returns a response corresponding to the memory request to the host device 10, as described above, the operation of converting into the CXL flit ma be performed.

Figure 2:
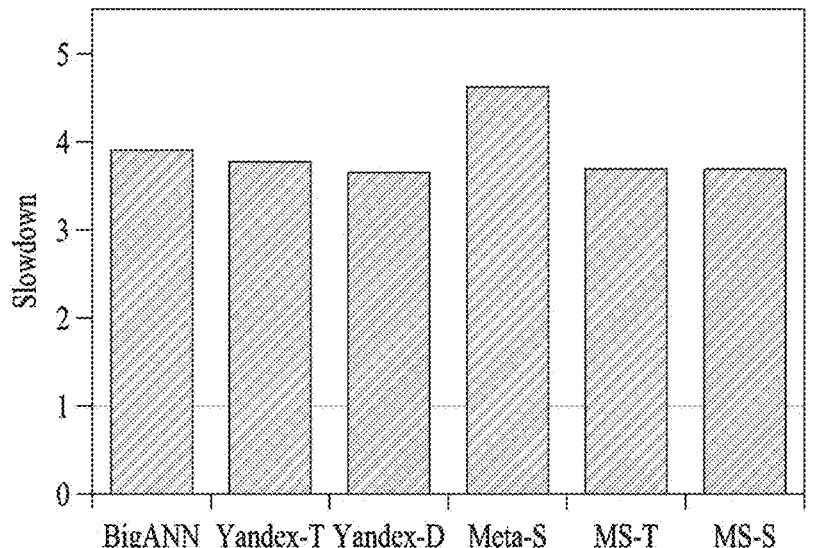
FIG. 2 is a diagram illustrating the application performance due to CXL protocol-based memory expansion.

FIG. 2 is a diagram illustrating the application performance due to CXL protocol-based memory expansion.

A CXL protocol may provide a large amount of memory to a host device. The CXL protocol may be a protocol that allows the host device to access an expanded memory (e.g., a large amount of memory) using the same command as accessing a general host memory. The CXL protocol may be suitable for supporting a large-scale application performed by the host device. However, a memory connected to the host device through the CXL protocol inevitably has a longer delay time than a host memory, which may degrade the performance of an application.

FIG. 2 shows the performance degradation of the application when the benchmark of six approximate nearest neighbor searches is performed on the expanded memory based on a CXL. The performance degradation of the application may be a comparison result between an execution time of an approximate nearest neighbor search based on the host memory and an execution time of an approximate nearest neighbor search based on the expanded memory. The approximate nearest neighbor search may be a core algorithm of a search engine and a recommendation system with machine learning applied. Referring to FIG. 2, it may be seen that the performance of the approximate nearest neighbor search decreases by approximately 3.9 times This performance degradation of the application may be due to an additional time required for a memory request and a response to be converted into a CXL flit and/or an additional time required for the CXL flit to travel through a host-to-device interconnect via a CXL switch. To solve this, it may be necessary to reduce the amount of memory request and response (e.g., the size of data) transmitted between the host device and a CXL device.

Figure 3:
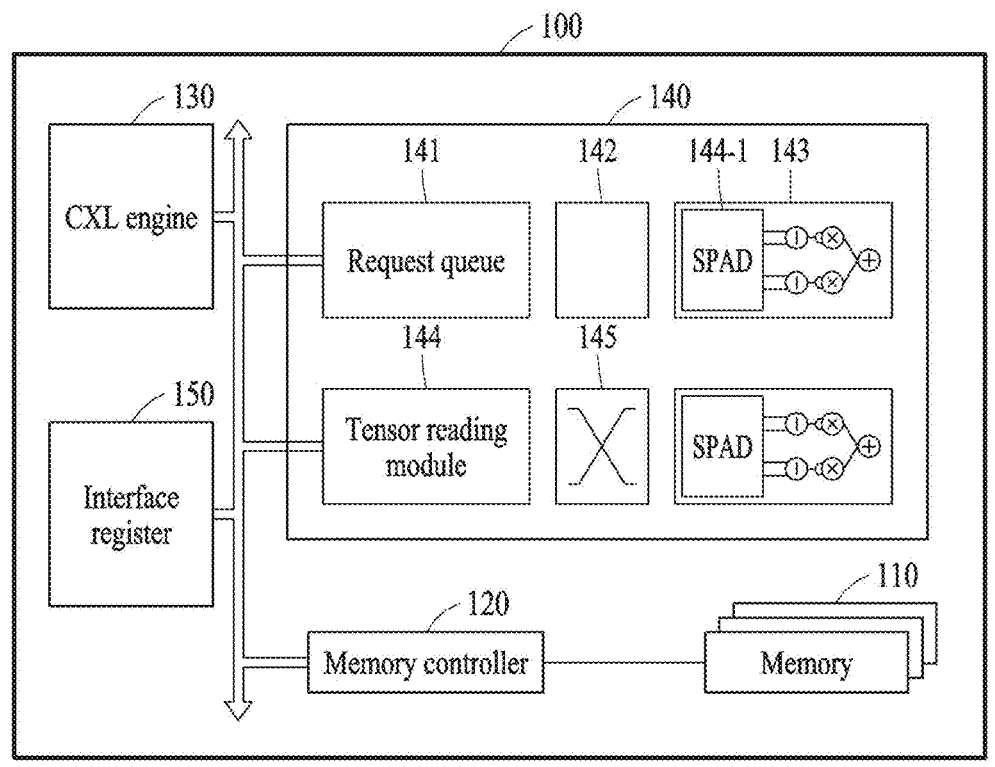
FIG. 3 is a schematic block diagram illustrating a memory expander according to an embodiment.

FIG. 3 is a schematic block diagram illustrating a memory expander according to an embodiment.

Figure 8:
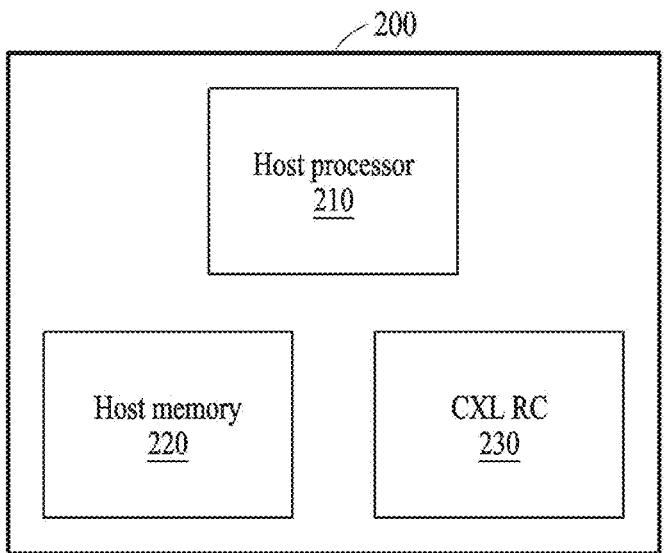
FIG. 8 is a schematic block diagram illustrating a host device according to an embodiment.

According to an embodiment, a memory expander 100 may reduce the size of data returned to a host device (e.g., a host device 200 of FIG. 8).

According to an embodiment, the memory expander 100 may be a device specialized in tensor processing. The memory expander 100 may perform a calculation on tensors stored in a memory of the memory expander 100. The memory expander 100 may calculate a similarity (e.g., a distance) between an input tensor acquired from the host device and stored (or cached) in the memory and tensors pre-stored in the memory.

The memory expander 100 capable of a calculation may be a type-3 device defined in a CXL protocol. By being implemented as the type-3 device, the memory expander 100 may not be affected by the number of connection devices of the host device, unlike a type-1 device or a type-2 device. The memory expander 100 may have high expandability (for example, more than 16 memory expanders 100 may be connected to one host device).

The memory expander 100 may return the calculation result for the tensors to the host device instead of an original tensor stored in the memory expander 100. The size of the calculation result for the tensors may be less than the original tensors. By returning the calculation result for the tensors to the host device, the memory expander 100 may reduce a movement amount of data (e.g., a tensor) and minimize a delay time caused by the data movement.

The memory expander 100 may be suitable for an application (e.g., an approximate nearest neighbor search) that uses a tensor. The memory expander 100 may shorten an execution time of the application (e.g., the approximate nearest neighbor search) through an internal accelerator while providing a large amount of memory to a computing system. The performance of the approximate nearest neighbor search may be improved using the memory expander 100 in type 3 capable of a calculation.

Referring to FIG. 3, the memory expander 100 may include a memory 110, a memory controller 120, a CXL engine 130, a domain-specific accelerator 140, and in interface register 150.

The memory 110 may store (or cache) a tensor. The memory 110 may store graph data. A node of the graph data may correspond to a tensor. The graph data is described below with reference to FIGS. 8 to 14. The memory 100 may be implemented as DRAM.

The memory controller 120 may be configured to control the memory 110.

The CXL engine 130 may acquire a CXL flit from the host device connected to the memory expander 100. The CXL engine 130 may acquire a calculation request for pieces of data (e.g., tensors) stored in the memory 100 by performing conversion on the CXL flit. The CXL engine 130 may transmit the calculation request to the domain-specific accelerator 140.

The domain-specific accelerator 140 may perform a calculation in response to the calculation request. The domain-specific accelerator 140 may include a request queue 141, a scheduler 142, at least one tensor calculation accelerator (e.g., 143), a tensor reading module 144, and a multiplexer 145.

The request queue 141 may store the calculation request of the host device. The scheduler 142 may allocate the calculation request to the at least one tensor calculation accelerator (e.g., 143). The at least one tensor calculation accelerator (e.g., 143) may perform a calculation between tensors in response to the allocated calculation request. The tensor reading module 144 may read the tensors from the memory 110 and transmit the tensors to the at least one tensor calculation accelerator (e.g., 143). In FIG. 3, the tensor reading module 144 is illustrated as one tensor reading module but is not limited thereto. That is, the domain-specific accelerator 140 may include two or more tensor reading modules. The multiplexer 145 may support the at least one tensor calculation accelerator (e.g., 143) to share the tensor reading module 144.

The at least one tensor calculation accelerator 143 may store tensors acquired from the tensor reading module 144 in a scratch pad (SPAD) 144-L. The at least one tensor calculation accelerator 143 may perform a first operation on corresponding elements among elements forming each of the tensors. The at least one tensor calculation accelerator 143 may perform a second operation that reduces the result of the first operation. The configuration and operation of the at least one tensor calculation accelerator 143 are described in detail below with reference to FIGS. 4 to 6.

The interface register 150 may acquire a doorbell signal from the host device. The operation of the memory expander 100 may be triggered in response to receiving the doorbell signal. The doorbell signal may be a signal indicating that a command and/or data associated with the calculation request is written to a host memory of the host device. The operation of the interface register 150 is described in detail below with reference to FIG. 7.

Figure 4:
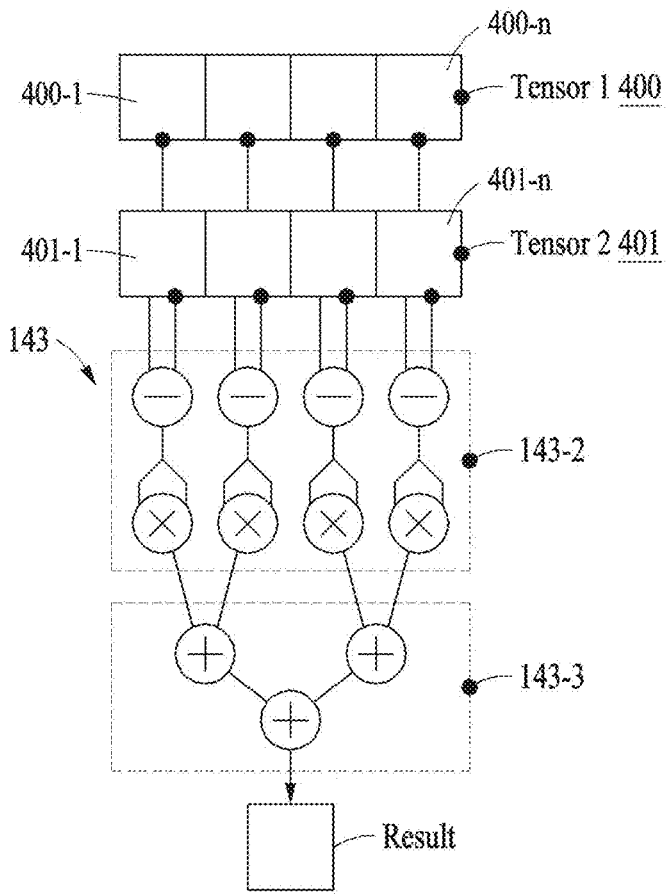
FIG. 4 is a diagram illustrating a tensor calculation accelerator according to an embodiment.

FIG. 4 is a diagram illustrating a tensor calculation accelerator according to an embodiment.

Referring to FIG. 4, the at least one tensor calculation accelerator 143 may include a SPAD (e.g., the SPAD 144-1 of FIG. 3), at least one element-wise calculation module 143-2, and a tensor reduction module 143-3.

Tensors (e.g., tensor 1 400 and tensor 2 401) may be stored (or cached) in the SPAD. The at least one tensor calculation accelerator 143 may perform a calculation between the tensor 1 400 and the tensor 2 401 through the at least one element-wise calculation module 143-2 and the tensor reduction module 143-3. The calculation result between the tensor 1 400 and the tensor 2 401 may be returned to a host device. The calculation result between the tensor 1 400 and the tensor 2 401 may have a size that is less than the tensor 1 400 and/or the tensor 2 401.

The at least one element-wise calculation module 143-2 may perform a first operation on corresponding elements 400-1 and 401-1 or 400-$n$ and 401-$n$ among elements (400-1 to 400-$n$ and 401-1 to 401-$n$) forming each of the tensors (e.g., the tensor 1 400 and the tensor 2 401). The first operation may include an arithmetic operation.

The tensor reduction module 143-3 may perform a second operation on the result of the first operation. The second operation may be an operation to reduce the result of the first operation. For example, the second operation may correspond to an addition operation (e.g. an operation of adding all elements).

Figure 5:
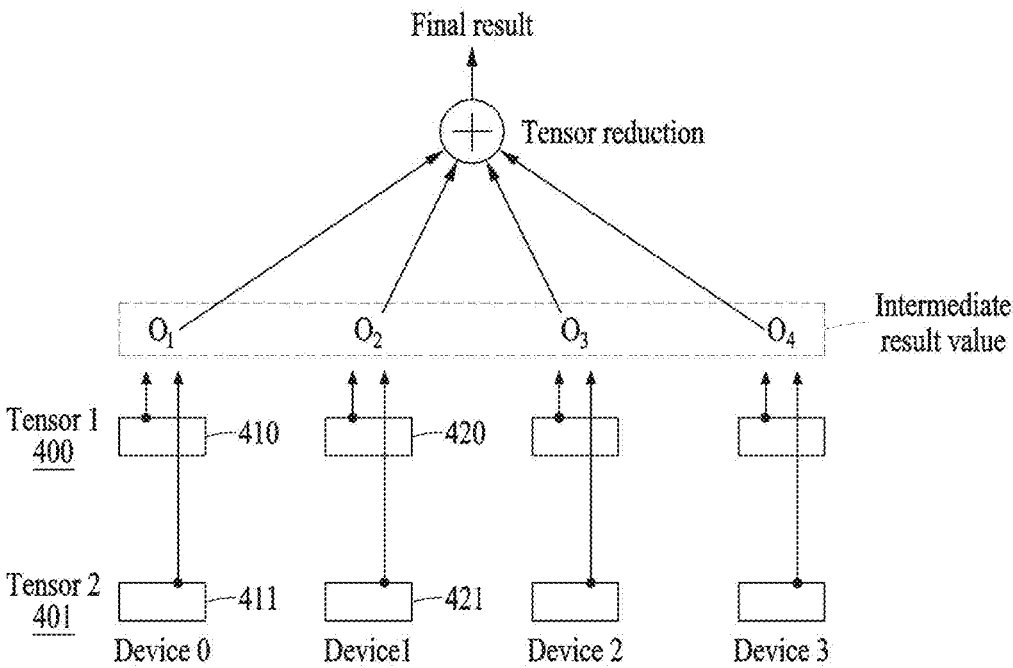
FIG. 5 is a diagram illustrating the division storage of a tensor, according to an embodiment.

FIG. 5 is a diagram illustrating the division storage of a tensor, according to an embodiment.

Referring to FIG. 5, according to an embodiment, each of tensors may be divided and stored in a plurality of memory expanders (e.g., a device 0 to a device 3). The plurality of memory expanders (e.g., the device 0 to the device 3) may be connected to one host device. Accordingly, to use the bandwidth of a memory expander to the max, a host device may divide and store tensors (e.g., the tensor 1 400 and the tensor 2 401) in the plurality of memory expanders (e.g., the device 0 to the device 3).

That is, a tensor calculation accelerator (e.g., the at least one tensor calculation accelerator 143 of FIG. 4) included in one memory expander may perform a calculation on at least a portion of the tensors (e.g., the divided tensors) (for example, a tensor calculation accelerator of the device 0 (e.g., a memory expander) may perform a calculation on a divided tensor 410 and a divided tensor 411, and a tensor calculation accelerator of the device 1 may perform a calculation on a divided tensor 420 and a divided tensor 421.

As described above, one (e.g., the tensor 1 400) of the tensors may be an input tensor acquired from the host device and stored (or cached) in a memory, and the other one (e.g., the tensor 2 401) of the tensors may be a tensor pre-stored in the memory. The sizes of the divided tensors (e.g., the divided tensor 410 and the divided tensor 420 or the divided tensor 411 and the divided tensor 421) may be substantially the same. By dividing the tensors into similar sizes, the amount of calculations of memory expanders may also be set to be substantially the same.

Figure 6:
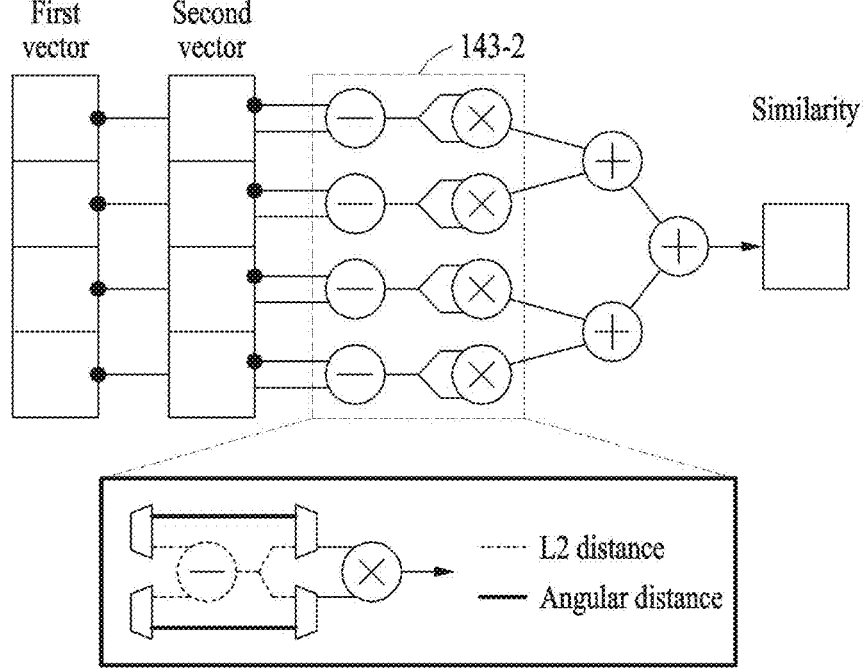
FIG. 6 is a diagram illustrating an element-wise calculation module according to an embodiment.

FIG. 6 is a diagram illustrating an element-wise calculation module according to an embodiment.

FIG. 6 shows, according to an embodiment, an example of the at least one element-wise calculation module 143-2. Tensors may be used for an approximate nearest neighbor search. The at least one element-wise calculation module 143-2 may be configured to be suitable for an application (e.g., an approximate nearest neighbor search) that uses a large-scale tensor. Each of the tensors may correspond to an embedding vector. The terms "tensor" and "vector," which are used interchangeably below, may refer to substantially the same object.

The at least one element-wise calculation module 143-2 may perform a first operation between a first vector and a second vector. The first operation may correspond to a similarity between the first vector and the second vector. The similarity between vectors may be determined by a Euclidean distance (e.g., an L2 distance) between vectors and/or an angular distance between vectors.

The Euclidean distance (e.g., the L2 distance) between vectors may be calculated using Equation 1 below.

$$L2 \text{ distance} = \Sigma(\text{first vector}_i - \text{second vector}_i)^2 \quad \text{[Equation 1]}$$

The angular distance between vectors may be calculated using Equation 2 below.

$$\text{Angular distance} = \Sigma \text{first vector}_i \cdot \text{second vector}_i \quad \text{[Equation 2]}$$

The structure of the at least one element-wise calculation module 143-2 may be determined in response to the calculation method of the similarity between vectors. The structure of the at least one element-wise calculation module 143-2 may vary depending on the calculation method of the similarity between vectors (for example, a path between operators may be routed differently). The structure of the at least one element-wise calculation module 143-2 described with reference to FIGS. 3 and 4 may correspond to the Euclidean distance (e.g., the L2 distance) between vectors.

The at least one element-wise calculation module 143-2 may each perform the first operation simultaneously. The tensor reduction module 143-3 may perform a second operation on the result of the first operation. The second operation may be an operation (e.g., an addition operation) to reduce the result of the first operation. The less the result (e.g., the distance between vectors) of the second operation, the higher the similarity between vectors.

Figure 7:
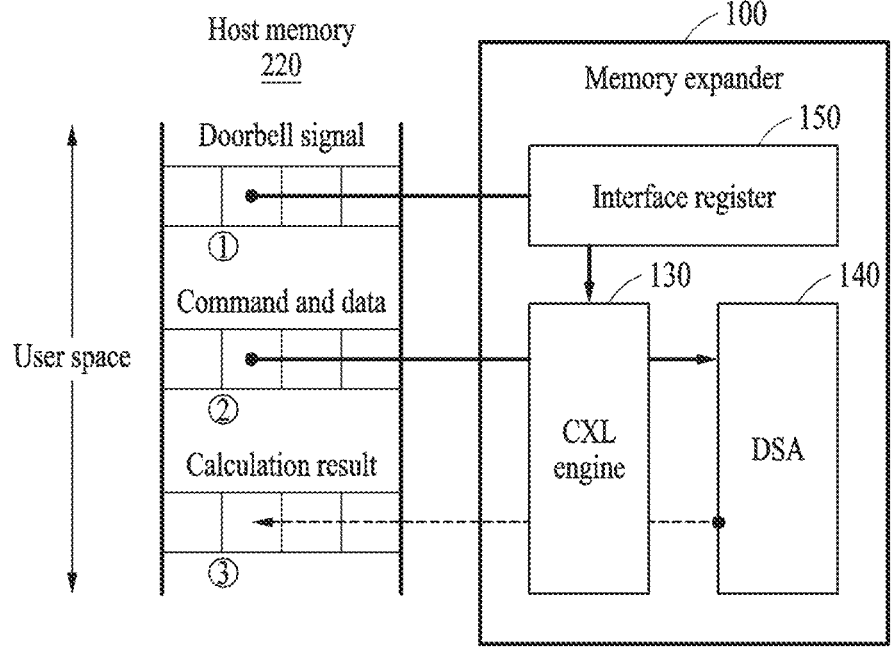
FIG. 7 is a diagram illustrating an interface between a host device and a memory expander, according to an embodiment.

FIG. 7 is a diagram illustrating an interface between a host device and a memory expander, according to an embodiment.

FIG. 7 shows, according to an embodiment, an interface used when a host device (e.g., the host device 200 of FIG. 8) transmits a request to the memory expander 100.

A naive host device may transmit a request (e.g., a request including a command and/or data) to all memory expanders through a memory-mapped input/output (MMIO) that follows a CXL.io protocol. However, a method in which the host device transmits a request to all memory expanders may be a method with great overhead.

According to an embodiment, a computing system including the host device (e.g., the host device 200 of FIG. 8) and the memory expander 100 may reduce overhead using a doorbell signal.

The host device 200 may store a command and/or data associated with a calculation request in a host memory 220. The host device 200 may transmit a doorbell signal associated with the calculation request to the memory expander 100. The doorbell signal may be a signal indicating that the command and/or data associated with the calculation request is written to the host memory 220 of the host device 200. The reception of the doorbell signal may be performed by the interface register 150 of the memory expander 100.

Referring to FIG. 7, the doorbell of the host memory 220, a buffer for transmission of the command and data, and a buffer for acquisition of the calculation result may correspond to a user-level memory. Unlike a kernel-level memory, the user-level memory may be a memory area that is accessible to a user process (e.g., a user application). Accordingly, a user-level application (e.g., an approximate nearest neighbor search application) may directly acquire data from the user-level memory or directly store data in the user-level memory. Through the interface, the host device 200 and the memory expander 100 may communicate with each other while minimizing a system call.

In response to receiving the doorbell signal, the memory expander 100 may access the host memory 200 and acquire a CXL flit (e.g. a CXL flit in which conversion is performed on a command and/or data) associated with the calculation request. The access of the memory expander 100 to the host memory 220 may be direct memory access (DMA). DMA may also be a method of accessing the host memory 220 according to the CXL.io protocol.

The CXL engine 130 of the memory expander 100 may acquire the command and/or data associated with the calculation request by performing conversion on the CXL flit. The domain-specific accelerator 140 of the memory expander 100 may perform a calculation between tensors based on the command and/or data. As described above, the tensors to be calculated may be stored (or cached) in a memory (e.g., the memory 110 (e.g., DRAM) of FIG. 3) of the memory expander 100. The memory expander 100 may convert the calculation result between the tensors into the CXL flit and return the CXL flit to the host memory 220.

Each of a plurality of memory expanders that receives the doorbell signal may perform substantially the same operation as the operation of the memory expander 100. The plurality of memory expanders that receives the doorbell signal may perform operations in parallel. Since the host device 200 transmits only the doorbell signal, the total overhead of the computing system may be reduced. Hereinafter, an operation in which the host device uses the memory expander 100 described above for an application is described.

FIG. 8 is a schematic block diagram illustrating a host device according to an embodiment.

According to an embodiment, the host device 200 may use a memory expander (e.g., the memory expander 100 of FIG. 3) capable of a calculation. The memory expander 100 capable of a calculation may be a type-3 device defined in a CXL protocol. The host device 200 may connect 16 or more memory expanders 100.

The host device 200 may use the plurality of memory expanders (e.g., 100) for an application (e.g., an approximate nearest neighbor search) using a large-scale tensor. The plurality of memory expanders (e.g., 100) may provide a large amount of memory to the host device 200. The plurality of memory expanders (e.g., 100) may shorten an execution time of the application (e.g., the approximate nearest neighbor search) through an internal accelerator. The performance of the approximate nearest neighbor search may be improved using the memory expander 100 that performs a calculation on a tensor.

The host device 200 may perform the approximate nearest neighbor search. The result of the approximate nearest neighbor search may be, among tensors pre-stored in the memory expander 100, tensors that are similar to an input tensor input to the host device 200. The input tensor may also be stored (or cached) in the memory expander 100.

The host device 200 may use graph data for the approximate nearest neighbor search. Each of nodes of the graph data may correspond to the pre-stored tensors (e.g., the tensors pre-stored in the memory expander 100). That is, the graph data corresponding to the pre-stored tensors may be pre-generated. The pre-generated graph data may also be pre-stored in the memory expander 100. However, at least a portion of the graph data may be stored (or cached) in the host device 200, which is described in detail below with reference to FIG. 12.

The host device 200 may include a host processor 210, the host memory 220, and a CXL RC 230.

The host processor 210 may process data stored in the host memory 220. The host processor 210 may execute computer-readable code (e.g., software) stored in the host memory 220 and instructions triggered by the host processor 210.

The host processor 210 may be a data-processing device implemented by hardware having a circuit of a physical structure to execute desired operations. For example, the desired operations may include code or instructions included in a program.

The hardware-implemented data-processing device may include, for example, a microprocessor, a CPU, a processor core, a multi-core processor, a multiprocessor, an application-specific integrated circuit (ASIC), and a field-programmable gate array (FPGA).

The host memory 220 may be implemented as a volatile memory device or a non-volatile memory device.

The volatile memory device may be implemented as DRAM, static RAM (SPAM), thyristor RAM (T-RAM), zero capacitor RAM (Z-RAM), or twin transistor RAM (TTRAM).

The non-volatile memory device may be implemented as electrically erasable programmable read-only memory (EEPROM), flash memory, magnetic RAM (MRAM), spin-transfer torque (STT)-MRAM, conductive bridging RAM (CBRAM), ferroelectric RAM (FeRAM), phase change RAM (PRAM), resistive RAM (RRAM), nanotube RRAM, polymer RAM (PoRAM), nano floating gate memory (NFCM), holographic memory, a molecular electronic memory device, or insulator resistance change memory.

The CXL RC 230 may support the CXL protocol.

The approximate nearest neighbor search may be an application that searches for, among vectors of a system (e.g., a computing system), a vector that is most similar to a vector provided by a user. The tensor described above with reference to FIGS. 3 to 7 may correspond to an embedding vector. The tensor and vector, which are used interchangeably below, may refer to substantially the same object.

Figure 9:
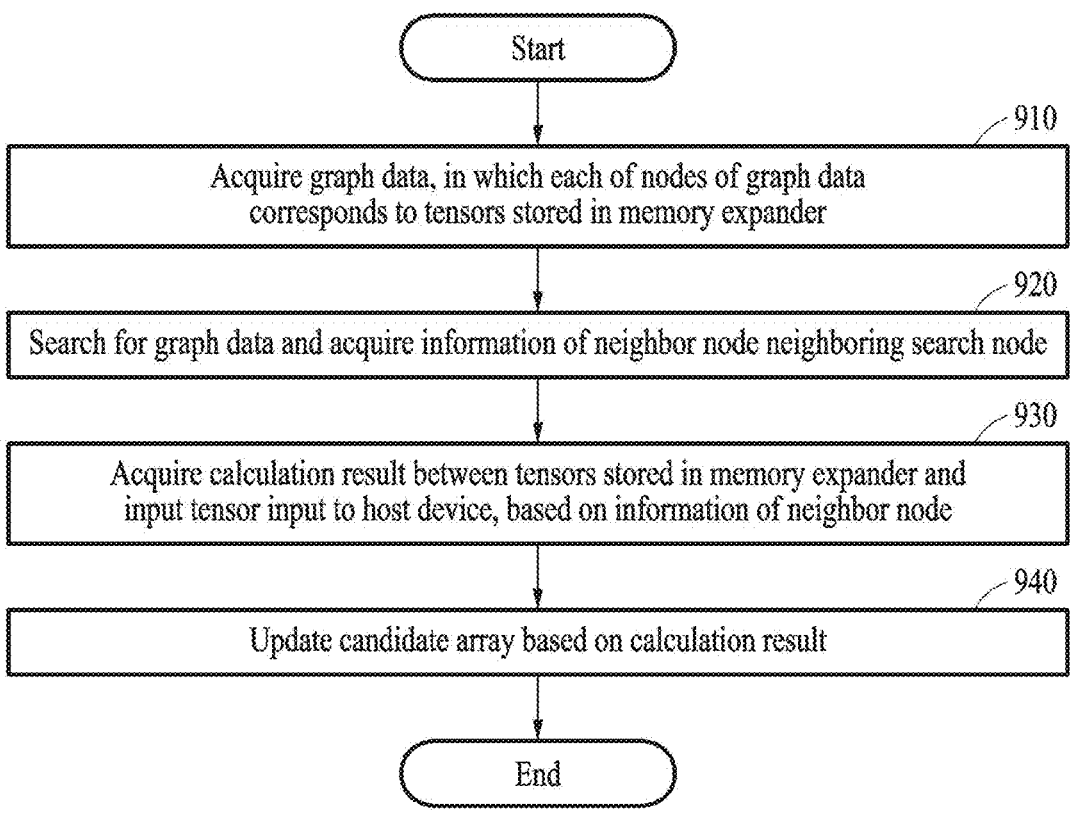
FIG. 9 is a flowchart illustrating an operating method of a host device, according to an embodiment.
Figure 10:
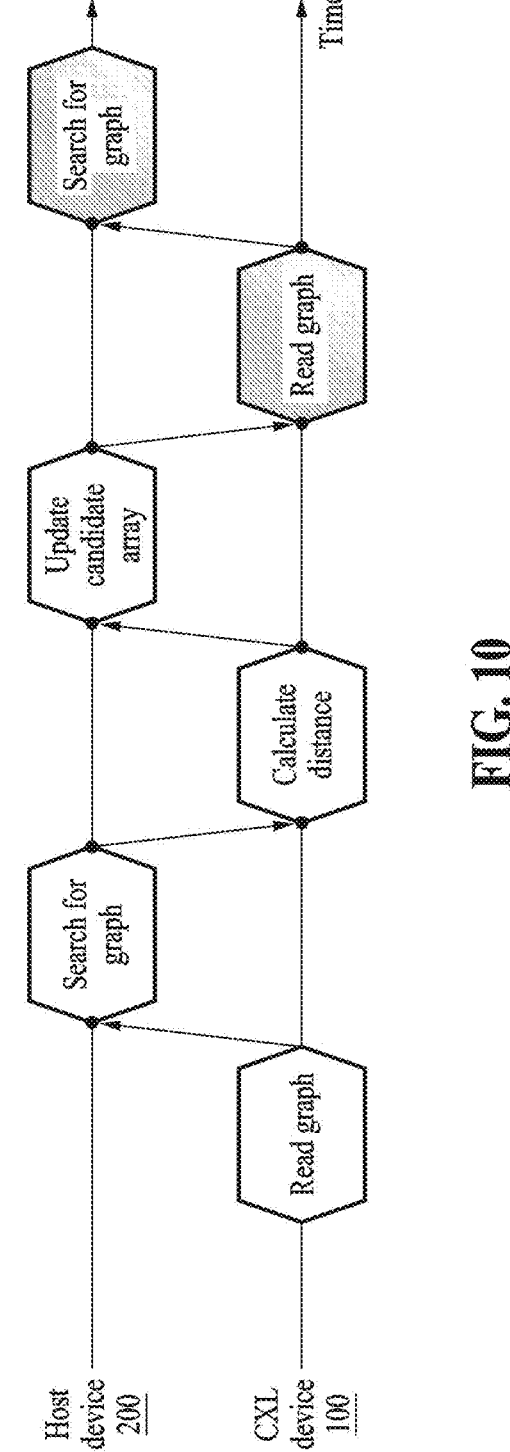
FIG. 10 is a flowchart illustrating an operation of a host device and a memory expander, according to an embodiment.

FIG. 9 is a flowchart illustrating an operating method of a host device, according to an embodiment, and FIG. 10 is a flowchart illustrating an operation of a host device and a memory expander, according to an embodiment.

The host device 200 may start searching for (e.g., visiting an initial search node) (e.g., searching for a neighbor node of the initial search node) graph data based on an initial search node (e.g., an entry node). The entry node may be anode that may reach each of nodes of the graph data only with the minimum number of edge hops.

The host device 200 may set, among neighbor nodes of a visited node (e.g., the initial search node), a neighbor node that is close to an input tensor as a search node. The host device 200 may repeat visiting (e.g., searching for) the neighbor node of the newly set search node.

The host device 200 may use a candidate array to minimize overhead of a graph (or graph data) search. The candidate array may include information about the visited node. The candidate array may include, among tensors stored in a memory expander (e.g., the memory expander 100 of FIG. 3), information about a tensor that is similar to the input tensor. It should be noted that the nodes of the graph data correspond to the tensors stored in the memory expander 100.

Referring to FIG. 9, operations 910 to 940 of the host device 200 may be performed sequentially but are not limited thereto. For example, two or more operations may be performed in parallel.

In operation 910, the host device 200 may acquire the graph data. Referring to FIG. 10, the host device 200 may acquire the graph data read by the memory expander 100.

In operation 920, the host device 200 may search for the graph data and acquire information of a neighbor node neighboring the search node. The host device 200 may acquire information of the neighbor node neighboring the search node by visiting the search node.

In operation 930, the host device 200 may acquire a calculation result (e.g., a distance calculation result) between the tensors stored in the memory expander 100 and the input tensor input to the host device 200, based on the information of the neighbor node. Referring to FIG. 10, the distance calculation may be performed by the memory expander 100. As described above with reference to FIG. 7, the host device 200 may transmit a doorbell signal to the memory expander 100. As described above with reference to FIGS. 3 to 6, the memory expander 100 that receives the doorbell signal may perform a calculation and return the calculation result to the host device 200. It should be noted that the memory expander 100 is a type-3 device defined in a. CXL protocol although the memory expander 100 performs a calculation.

In operation 940, the host device 200 may update the candidate array based on the calculation result. Specifically, the host device 200 may insert information into the candidate array. The host device 200 may sort nodes of the candidate array into which the information is inserted. The host device 200 may select a subsequent search node from the sorted nodes of the candidate array.

The inserting of the information into the candidate array may include the following operations. The host device 200 may display, whether a current search node visits the candidate array. The host device 200 may add a neighbor node (e.g., the neighbor node of the search node) to the candidate array. The host device 200 may map the calculation result to the neighbor node.

The candidate array may include the nodes included in the graph data. A correspondence relationship between the nodes and the tensors stored in the memory expander 100 may be mapped to the nodes forming the candidate array. Whether the nodes visit may be mapped to the nodes forming the candidate array. The calculation result between the tensors corresponding to the nodes and the input tensor may be mapped to the nodes forming the candidate array. It should be noted that the calculation result may be mapped to nodes that the host device 200 does not visit.

The selecting of the subsequent search node may include the following operations. The host device 200 may select a node having the highest similarity with the input tensor as the subsequent search node from among unvisited nodes in the sorted nodes of the candidate array. The host device 200 may repeatedly perform operations 910 to 940 based on the subsequent search node.

Operations 910 to 940 may be terminated when there are no unvisited nodes among the nodes forming the candidate array. The return result of the approximate nearest neighbor search according to the termination of operations 910 to 940 may be information of the nodes (e.g., k nodes corresponding to a tensor that is significantly similar to the input tensor) included in the candidate array.

An approximate nearest neighbor search algorithm shows a high speed and high accuracy, but all tensors to be searched for may need to be pre-stored in a memory. In an environment where billions of tensors are searched for a method of expanding the memory (e.g., the CXL protocol) may be required. The host device 200 may perform the approximate nearest neighbor search using the plurality of memory expanders (e.g., 100) that supports the CXL protocol.

While a tensor is data having hundreds of bytes, the calculation result between the tensors may be data having about 4 bytes. The host device 200 may effectively perform the approximate nearest neighbor search using the plurality of memory expanders (e.g., 100) capable of a calculation.

Figure 11:
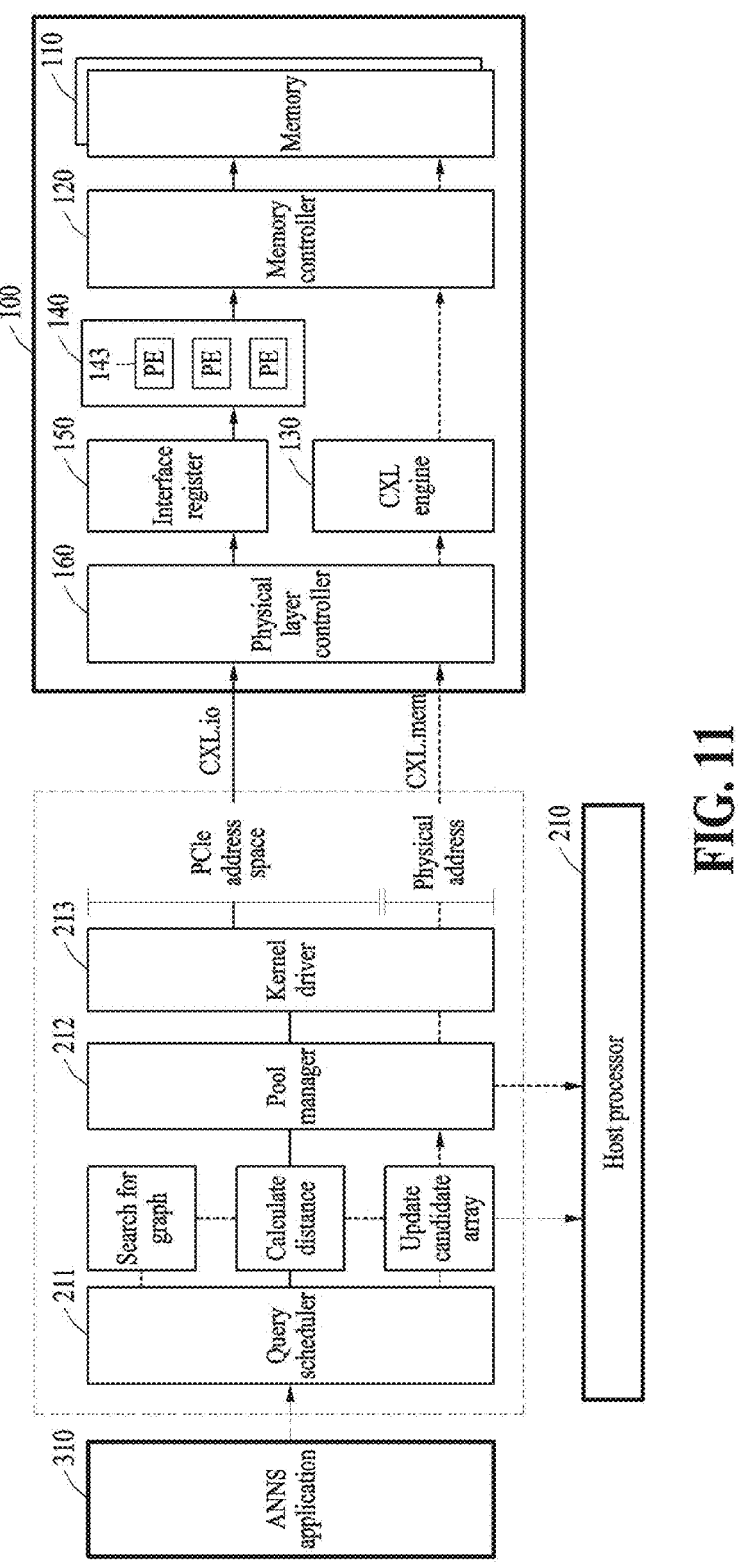
FIG. 11 is a diagram illustrating an operation of a host device and a memory expander, according to an embodiment.

FIG. 11 is a diagram illustrating an operation of a host device and a memory expander, according to an embodiment.

FIG. 11 shows the entire computing system. The computing system may include a software stack implemented in a host device (e.g., the host device 200 of FIG. 8) and the memory expander 100 implemented as hardware.

The software stack of the host device 200 may include a query scheduler 211, a pool manager 212, and a kernel driver 213.

The query scheduler 211 may schedule requests of an application (e.g., an approximate nearest neighbor search application 310) into three tasks (e.g., a graph search, a distance calculation, and a candidate array update). The graph search and the candidate array update may be scheduled (e.g., allocated) to the host processor 210, and the distance calculation may be scheduled (e.g., allocated) to the memory expander 100.

The pool manager 212 may allocate graph data and tensor data to a memory (e.g., the memory 110 of the memory expander 100). When data is allocated to the memory, the pool manager 212 may consider the size and structure of the data. Considering that the sizes of pieces of data are different for each node of the graph data, the pool manager 212 may use a buddy-type memory allocator for memory allocation of the graph data. Considering that the sizes of the pieces of tensor data are all the same, the pool manager 212 may use a stack method that uses an area pointer for memory allocation of the tensor data. The stack method may allocate a new memory to the tensor data by increasing the area pointer by the size of data to be allocated. The stack method may store tensors in consecutive physical addresses and may thus be an easy method for lookup. In addition, the pool manager 212 may manage a physical address of the graph data and a physical address of the tensor (or tensor data) in an address space of the host device 200.

The kernel driver 213 may map the memory 110 of the memory expander 100 to an HPA using a CXL.mem protocol. The kernal driver 213 may map the interface register 150 of the memory expander 100 to anon-cacheable PCIe address space through a CXL.io protocol, so the host device 200 and the memory expander 100 may exchange signals in real time.

As described above, the host device 200 may use two pieces of data (the graph data and the tensor data) to execute the approximate nearest neighbor search. The tensors may be stored in the memory expander 100, and at least a portion of the graph data may be stored (or cached) in the host device 200.

Figure 12:
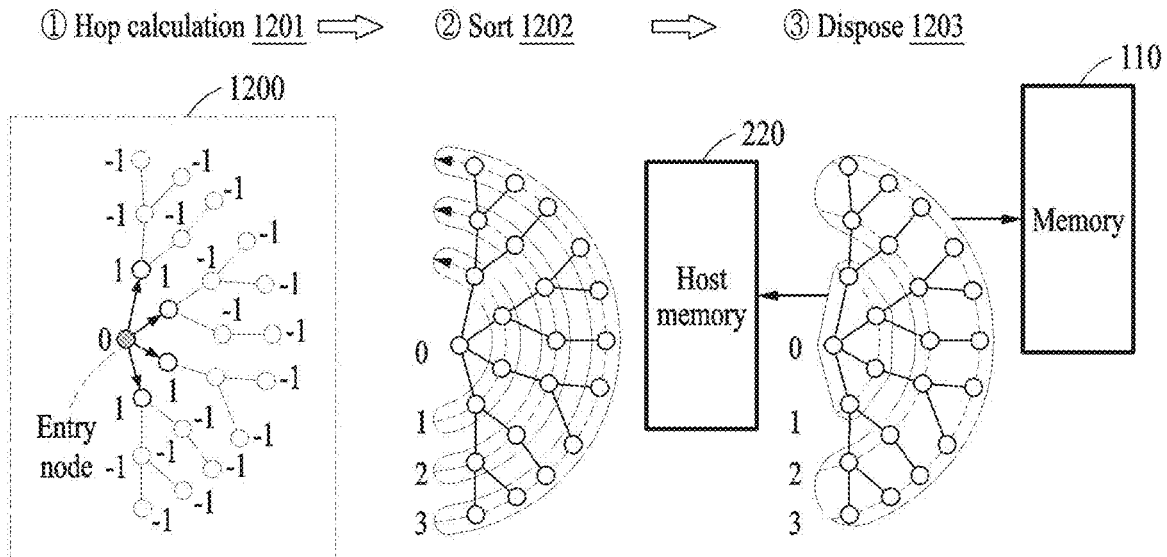
FIG. 12 is a diagram illustrating a storage location of graph data, according to an embodiment.

FIG. 12 is a diagram illustrating a storage location of graph data, according to an embodiment.

Referring to FIG. 12, according to an embodiment, at least a portion of graph data 1200 may be stored in the host memory 220 of a host device. At least a portion of the graph data 1200 may be determined based on a preset hop count by neighbor nodes of an initial search node (e.g., an entry node).

The host device (e.g., the host device 200 of FIG. 8) (e.g., the pool manager 212 of FIG. 11) may allocate most of the graph data to a CXL memory pool (e.g., the memory 110 of the memory expander 100) but may cache frequently accessed nodes in the host memory 220 (e.g., a local memory) with fast access.

In operation 1201, the host device 200 may calculate a hop count for nodes of the graph data 1200. The hop count may correspond to the distance between a node and an entry node. The host device 200 may initialize all nodes of the graph data 1200 to a negative hop count and then calculate by adding the hop count of all adjacent nodes by +1, starting from the entry node. For example, a hop count of the entry node may be '0,' and a hop count of a neighbor node that is immediately neighboring the entry node may be '1.' The remaining nodes having a hop count of '−1' may be in a state in which the hop count calculation has not yet been performed.

In operation 1202, the host device 200 may sort the nodes in ascending order based on the calculated hop count.

In operation 1203, the host device 200 may cache as many nodes as possible from a node having the smallest hop count in the host memory 220 (e.g., a local memory).

The performance of the application may be improved by caching frequently accessed nodes in the host memory 220 (e.g., a local memory) with fast access.

Figure 13:
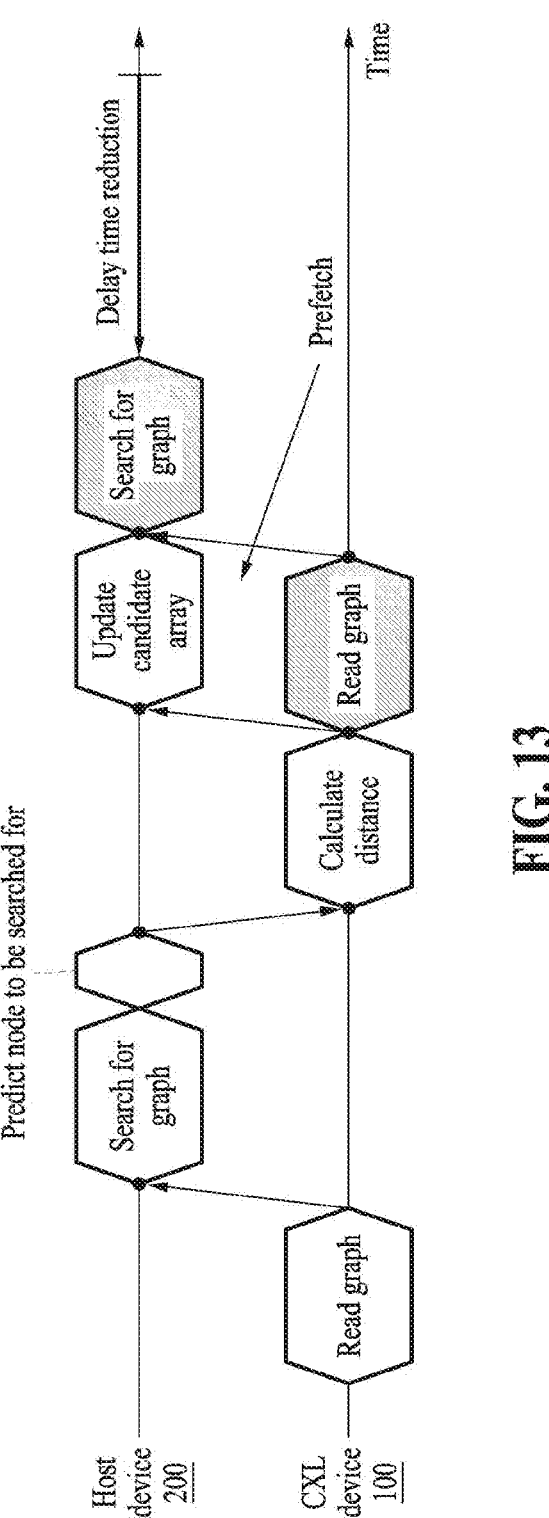
FIG. 13 is a diagram illustrating an operation of a host device and a memory expander with prefetch applied, according to an embodiment.

FIG. 13 is a diagram illustrating an operation of a host device and a memory expander with prefetch applied, according to an embodiment.

Referring to FIG. 13, according to an embodiment, the host device 200 may advance the selection (e.g., the prediction of a node to be searched for) of a subsequent search node to immediately after the graph data search. The host device 200 updating a candidate array may be performed in parallel with the memory expander 100 reading subsequent graph data.

Referring to FIG. 10, to search for the graph data, the graph data must be transmitted to the host device 200 in advance (for example, the memory expander 100 may read the graph data and transmit the read graph data to the host device 200). However, this algorithm may have a long delay time due to the graph data transmission.

To reduce the delay time, the host device 200 may advance the selection of the subsequent search node to immediately after the graph data search. Through this, the host device 200 may cause the graph data reading (and the graph data transmission) of the memory expander 100 to precede (e.g., prefetch) the subsequent graph data search.

However, in principle, the update of the search node (e.g., the selection of the subsequent search node) must be preceded by the distance calculation. This may be because the subsequent search node is the closest node among neighbors of a current search node or the closest node among nodes unvisited yet in the candidate array.

Based on experimental acquisitions (e.g., in the case of about 82.3%) the subsequent search node may be a node unvisited yet in an unupdated candidate array. Accordingly, the selection of the subsequent search node (e.g., the update of the search node) may be advanced to immediately after the graph data search.

Figure 14:
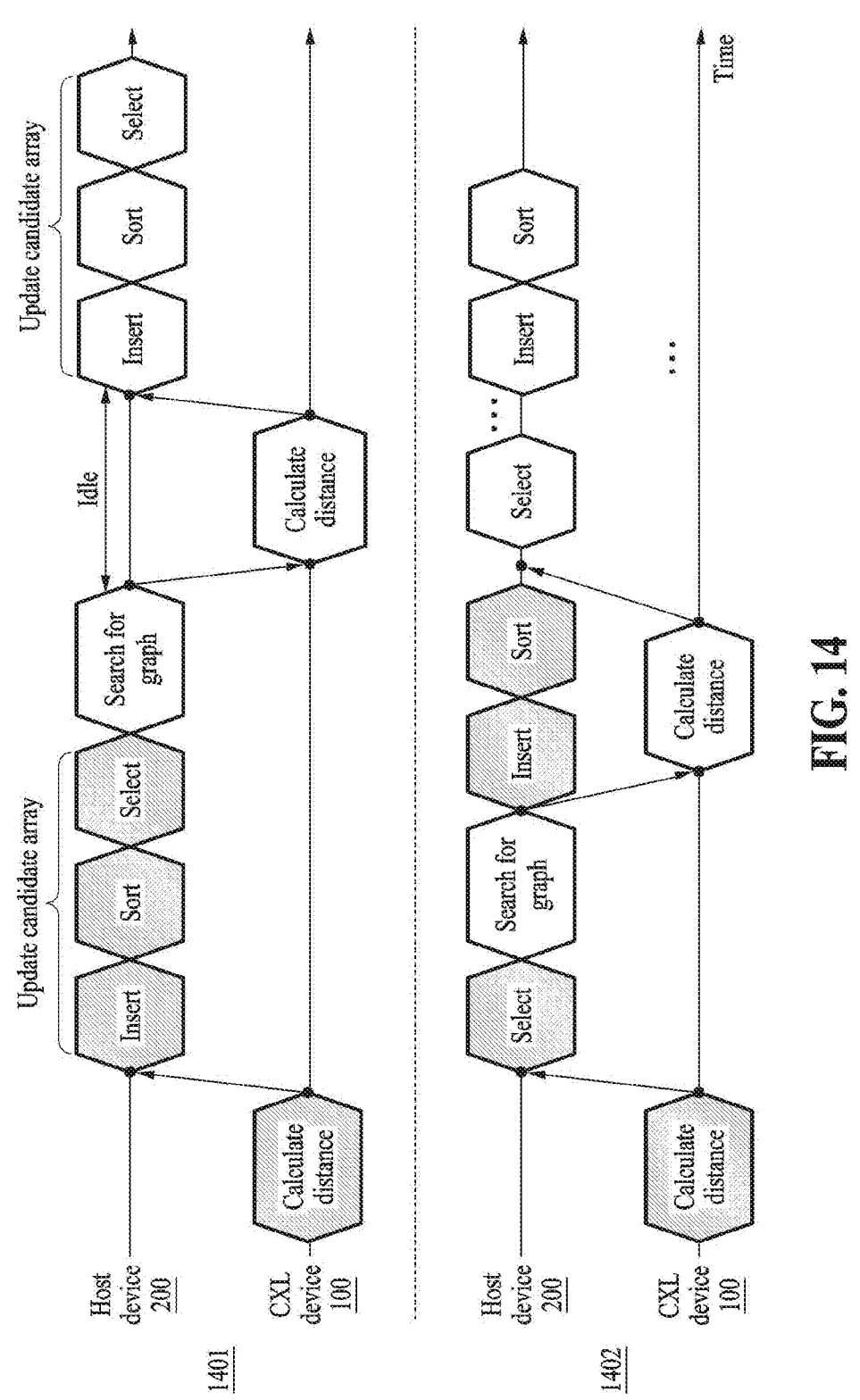
FIG. 14 is a diagram illustrating an operation of a host device and a memory expander with scheduling applied, according to an embodiment.

FIG. 14 is a diagram illustrating an operation of a host device and a memory expander with scheduling applied, according to an embodiment.

Referring to FIG. 14, according to an embodiment, the host device 200 may select a subsequent search node immediately after acquiring the distance calculation result. That is, the updating of a candidate array may be performed together with searching for subsequent graph data.

Referring to case 1 1401, the host device 200 may acquire a distance calculation result from the memory expander 100 and update the candidate array based on the distance calculation result. As described above with reference to FIG. 10, the updating of the candidate array may include inserting information into the candidate array, sorting nodes of the candidate array into which the information is inserted, and selecting the subsequent search node from the sorted nodes of the candidate array.

When the subsequent search node is determined, the host device 200 may search for subsequent graph data based on the subsequent search node. In FIG. 14, it should be noted that the reading of the subsequent graph data may be performed before searching for the subsequent graph data of the host device 200 although the reading of the subsequent graph data of the memory expander 100 is not illustrated.

Referring to case 2 1402, the host device 200 may select the subsequent search node immediately after acquiring the distance calculation result from the memory expander 100. The update of the search node (e.g., the selection of the subsequent search node) should be preceded only by the distance calculation. After first performing the selection of the subsequent search node during updating of the candidate array, the host device 200 may perform the remaining operations (inserting information into the candidate array and sorting the nodes of the candidate array into which the information is inserted) during updating of the candidate array. As a result, the updating of the candidate array may be performed together with the searching for the subsequent graph data. In addition, the updating of the candidate array by the host device 200 may be performed in parallel with the calculating of the subsequent distance of the memory expander 100.

The embodiments described herein may be implemented using a hardware component, a software component, and/or a combination thereof. A processing device may be implemented using one or more general-purpose or special-purpose computers, such as, for example, a processor, a controller and an arithmetic logic unit (ALU), a DSP, a microcomputer, an FPGA, a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciate that a processing device may include multiple processing elements and/or multiple types of processing elements. For example, the processing device may include a plurality of processors, or a single processor and a single controller. In addition, different processing configurations are possible, such as parallel processors.

The software may include a computer program, a piece of code, an instruction, or some combination thereof, to independently or uniformly instruct or configure the processing device to operate as desired. Software and data may be stored in any type of machine, component, physical or virtual equipment, or computer storage medium or device capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described embodiments may be recorded in non-transitory computer-readable media including program instructions to implement various operations of the above-described embodiments. The media may also include, alone or in combination with the program instructions, data files, data structures, and the like. The program instructions recorded on the media may be those specially designed and constructed for the purposes of embodiments, or they may be of the kind well-known and available to those having skill in the computer software arts. Examples of non-transitory computer-readable media include magnetic media such as hard disks, floppy disks, and magnetic tape; optical media such as CD-ROM discs and/or DVDs, magneto-optical media such as optical discs; and hardware devices that are specially configured to store and perform program instructions, such as read-only memory (ROM), random access memory (RAM), flash memory, and the like. Examples of program instructions include both machine code, such as produced by a compiler, and files containing higher-level code that may be executed by the computer using an interpreter.

The above-described hardware devices may be configured to act as one or more software modules in order to perform the operations of the above-described embodiments, or vice versa.

As described above, although the embodiments have been described with reference to the limited drawings, a person skilled in the art may apply various technical modifications and variations based thereon. For example, suitable results may be achieved if the described techniques are performed in a different order, and/or if components in a described system, architecture, device, or circuit are combined in a different manner, or replaced or supplemented by other components or their equivalents.

Accordingly, other implementations are within the scope of the following claims.

What is claimed is:

1. A memory expander comprising:
a memory;
a memory controller configured to control the memory;
a compute express link (CXL) engine configured to acquire a CXL flit associated with a calculation request for pieces of data stored in the memory by accessing a host memory of a host device connected to the memory expander and configured to acquire a command and data associated with the calculation request by performing conversion on the CXL flit; and
a domain-specific accelerator configured to perform a calculation between tensors corresponding to the calculation request based on the command and the data.

2. The memory expander of claim 1, wherein the memory expander is a type-3 device defined in a CXL protocol.

3. The memory expander of claim 1, further comprising:
an interface register configured to acquire a doorbell signal from the host device,
wherein the doorbell signal is a signal indicating that the command and the data associated with the calculation request are written to a host memory of the host device.

4. The memory expander of claim 1, wherein the domain-specific accelerator comprises:
a request queue configured to store the calculation request of the host device;
a scheduler configured to allocate the calculation request to at least one tensor calculation accelerator;
the at least one tensor calculation accelerator configured to perform a calculation between the tensors in response to the allocated calculation request;
a tensor reading module configured to read the tensors from the memory; and
a multiplexer configured to support the at least one tensor calculation accelerator to share the tensor reading module.

5. The memory expander of claim 4, wherein the at least one tensor calculation accelerator comprises:
at least one element-wise calculation module configured to perform a first operation on corresponding elements among elements forming each of the tensors; and
a tensor reduction module configured to perform a second operation on a result of the first operation.

6. The memory expander of claim 4, wherein
each of the tensors is divided and stored in a plurality of memory expanders comprising the memory expander, and
the at least one tensor calculation accelerator is configured to perform a calculation on at least a portion of the tensors.

7. The memory expander of claim 4, wherein
each of the tensors corresponds to an embedding vector, and
the at least one tensor calculation accelerator is configured to calculate a similarity between an input vector acquired from the host device and stored in the memory and a vector pre-stored in the memory.

8. The memory expander of claim 7, wherein the similarity corresponds to a Euclidean distance between the input vector and the vector or an angular distance between the input vector and the vector.

9. A computing system comprising:
a host device configured to store a command and data associated with a calculation request in a host memory and configured to transmit, to a memory expander, a doorbell signal indicating that the command and the data associated with the calculation request are written to the host memory, and
the memory expander configured to perform a calculation between tensors corresponding to the calculation request in response to receiving the doorbell signal and configured to transmit a result of the calculation between the tensors to the host memory,
wherein the tensors are stored in the memory expander.

10. The computing system of claim 9, wherein the doorbell signal is received by an interface register of the memory expander.

11. The computing system of claim 9, wherein the memory expander is configured to:
acquire a compute express link (CXL) flit associated with the calculation request by accessing the host memory;
acquire the command and the data by performing conversion on the CXL flit; and
perform a calculation between the tensors based on the command and the data.

12. The computing system of claim 11, wherein the accessing of the memory expander to the host memory is direct memory access (DMA).

13. The computing system of claim 11, wherein the calculation between the tensors is performed by a domain-specific accelerator comprised in the memory expander.

14. The computing system of claim 9, wherein the memory expander is a type-3 device defined in a CXL protocol.

15. An operating method of a host device configured to perform an approximate nearest neighbor search based on a search node, the operating method comprising:
acquiring graph data, wherein each of nodes of the graph data corresponds to tensors stored in a memory expander;
acquiring information of a neighbor node neighboring the search node by searching for the graph data;
acquiring a result of a calculation between the tensors stored in the memory expander and an input tensor input to the host device, based on the information of the neighbor node; and
updating a candidate array based on the result of the calculation,
wherein the candidate array comprises, among the tensors stored in the memory expander, information about a tensor that is similar to the input tensor.

16. The operating method of claim 15, wherein the calculation is performed by the memory expander, which is a type-3 device defined in a compute express link (CXL) protocol.

17. The operating method of claim 15, wherein the candidate array comprises the nodes comprised in the graph data,
wherein the nodes are mapping of a correspondence relationship between the nodes and the tensors stored in the memory expander, whether the nodes visit, and a calculation result between tensors corresponding to the nodes and the input tensor.

18. The operating method of claim 15, wherein updating of the candidate array comprises:
inserting information into the candidate array;
sorting nodes of the candidate array into which the information is inserted; and selecting a subsequent search node from the sorted nodes
of the candidate array.

19. The operating method of claim 18, wherein the inserting of the information into the candidate array comprises:

displaying whether the search node visits;

adding the neighbor node to the candidate array; and mapping the result of the calculation to the neighbor node.

20. The operating method of claim 18, wherein the selecting of the subsequent search node further comprises selecting, from among unvisited nodes in the sorted nodes of the candidate array, a node having a highest similarity with the input tensor as the subsequent search node.

* * * * *